(12) United States Patent
Lim

(10) Patent No.: US 11,908,624 B2
(45) Date of Patent: Feb. 20, 2024

(54) BROADBAND CAPACITOR

(71) Applicant: AMOTECH CO., LTD., Incheon (KR)

(72) Inventor: Byungguk Lim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 60 days.

(21) Appl. No.: 17/775,309

(22) PCT Filed: Oct. 16, 2020

(86) PCT No.: PCT/KR2020/014176
§ 371 (c)(1),
(2) Date: May 8, 2022

(87) PCT Pub. No.: WO2021/091113
PCT Pub. Date: May 14, 2021

(65) Prior Publication Data
US 2022/0384110 A1    Dec. 1, 2022

(30) Foreign Application Priority Data

Nov. 8, 2019 (KR) .................. 10-2019-0142960
Nov. 8, 2019 (KR) .................. 10-2019-0142961

(51) Int. Cl.
*H01G 4/01* (2006.01)
*H01G 4/06* (2006.01)

(52) U.S. Cl.
CPC .............. *H01G 4/01* (2013.01); *H01G 4/06* (2013.01)

(58) Field of Classification Search
CPC .. H01G 4/01; H01G 4/06; H01G 4/30; H01G 4/32; H01G 4/12; H01G 4/08
See application file for complete search history.

(56) References Cited

U.S. PATENT DOCUMENTS

| | | |
|---|---|---|
| 10,418,180 B2 | 9/2019 | Kageyame |
| 10,461,040 B2 | 10/2019 | Martinez et al. |
| 2009/0034153 A1 | 2/2009 | Togashi |
| 2010/0039749 A1* | 2/2010 | Ritter ............ H01G 4/30 29/25.42 |
| 2010/0232086 A1 | 9/2010 | Togashi |

(Continued)

FOREIGN PATENT DOCUMENTS

| | | |
|---|---|---|
| JP | 2009-033044 A | 2/2009 |
| JP | 2010-045372 A | 2/2010 |

(Continued)

OTHER PUBLICATIONS

Korean Office Action dated Jun. 23, 2022 as received in application No. 10-2019-0142960.

(Continued)

*Primary Examiner* — Michael P McFadden
(74) *Attorney, Agent, or Firm* — Maschoff Brennan

(57) ABSTRACT

Disclosed is a broadband capacitor in which an electrode unit comprises a main electrode and a plurality of side electrodes so as to facilitate changing of capacitance value. The disclosed broadband capacitor is formed by alternately stacking a first electrode set, which comprises a first main electrode and a plurality of side electrodes spaced apart from the first main electrode, and a second electrode set, which comprises a second main electrode and a plurality of side electrodes spaced apart from the second main electrode.

14 Claims, 14 Drawing Sheets

(56) References Cited

U.S. PATENT DOCUMENTS

| | | | |
|---|---|---|---|
| 2012/0075766 A1* | 3/2012 | Nishioka | H01G 4/005 |
| | | | 361/301.4 |
| 2012/0134068 A1* | 5/2012 | Chae | H01G 4/012 |
| | | | 361/321.2 |
| 2016/0099107 A1* | 4/2016 | Lee | H01G 4/30 |
| | | | 361/301.4 |
| 2016/0240317 A1* | 8/2016 | Ro | H01G 4/30 |
| 2017/0213647 A1 | 7/2017 | Ahn | |
| 2019/0279820 A1* | 9/2019 | Horn | D02G 3/045 |

FOREIGN PATENT DOCUMENTS

| | | |
|---|---|---|
| JP | 2010-219143 A | 9/2010 |
| JP | 2011-151224 A | 8/2011 |
| KR | 10-0593889 B | 6/2006 |
| KR | 10-2014-0120110 A | 10/2014 |
| KR | 10-2017-0087665 A | 7/2017 |
| KR | 102015809 B | 8/2019 |

OTHER PUBLICATIONS

Korean Office Action dated Jun. 23, 2022 as received in application No. 10-2019-0142961.

* cited by examiner

[FIG. 1]
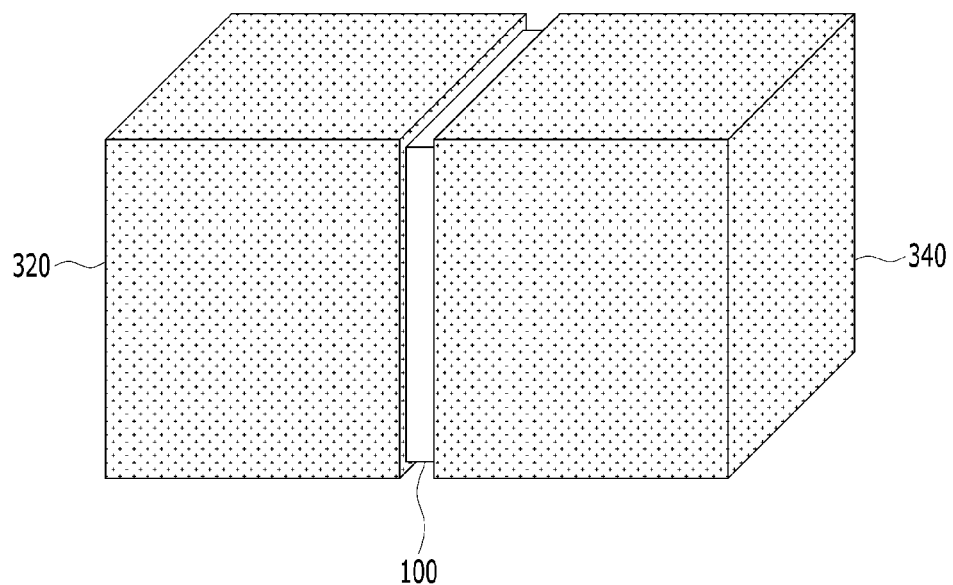

[FIG. 2]
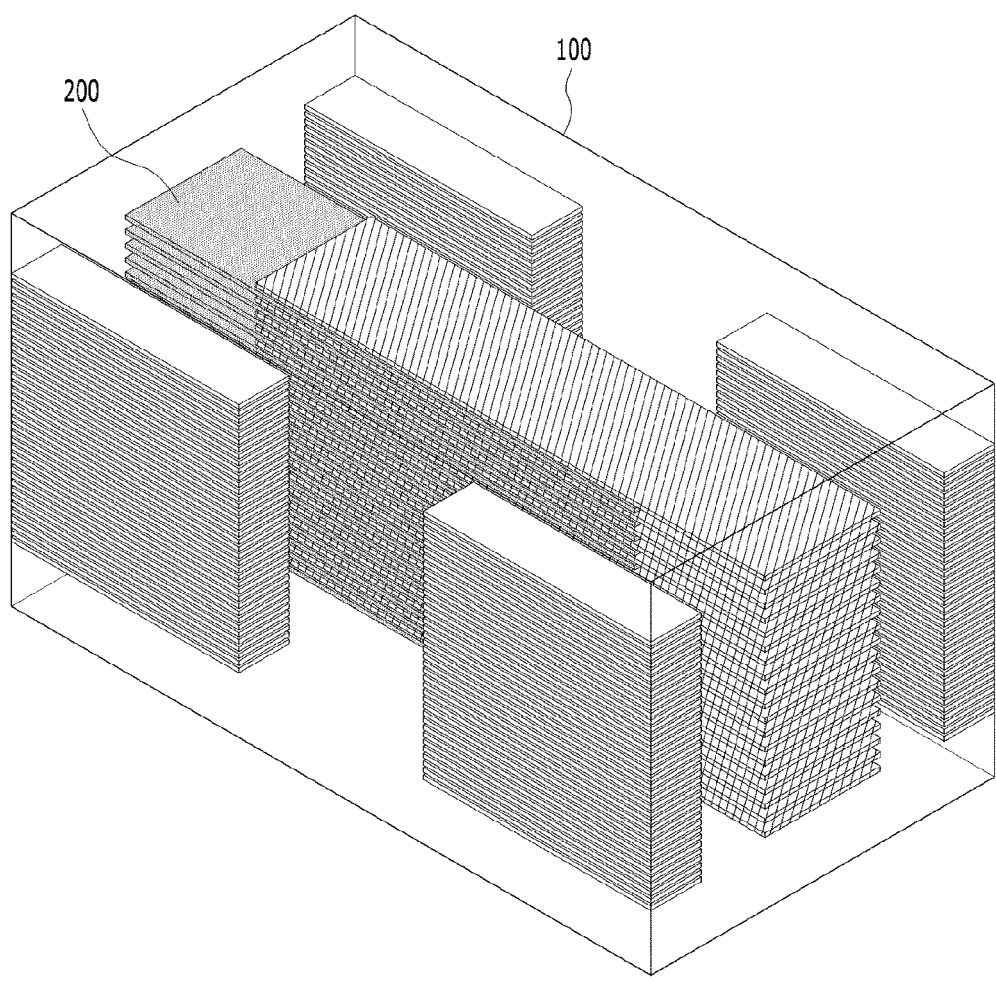

[FIG. 3]
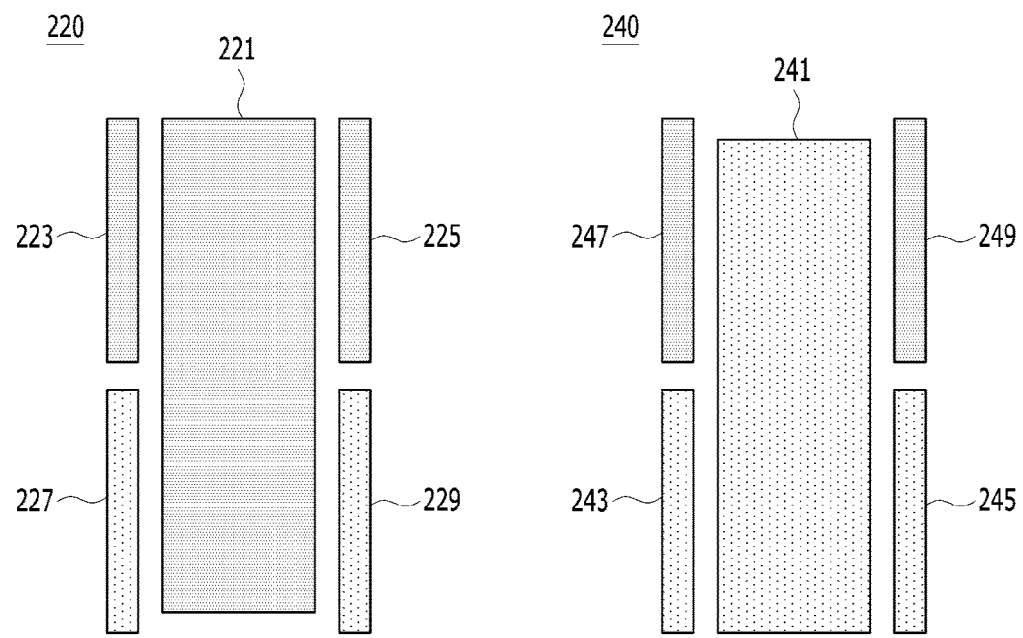

[FIG. 4]
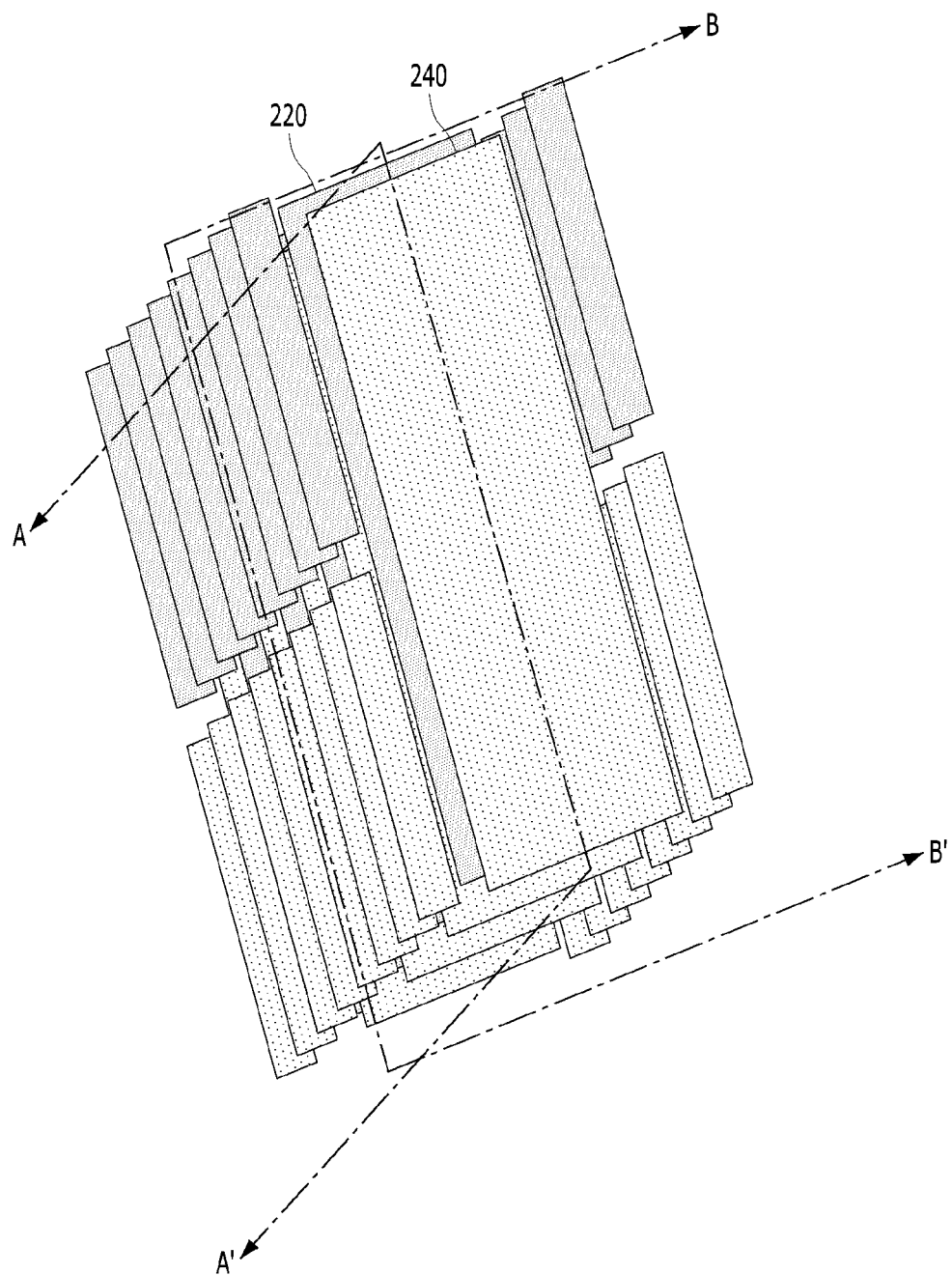

[FIG. 5]
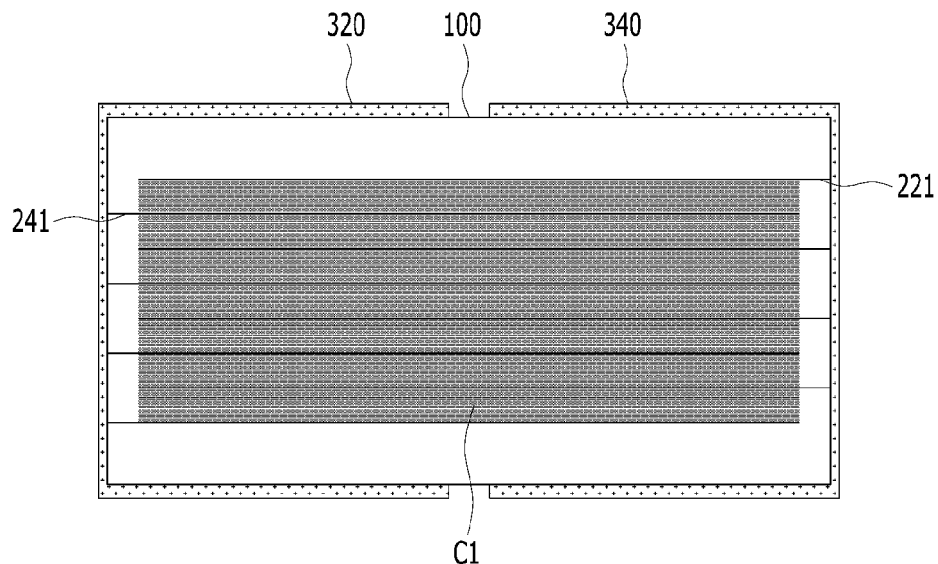
[FIG. 6]
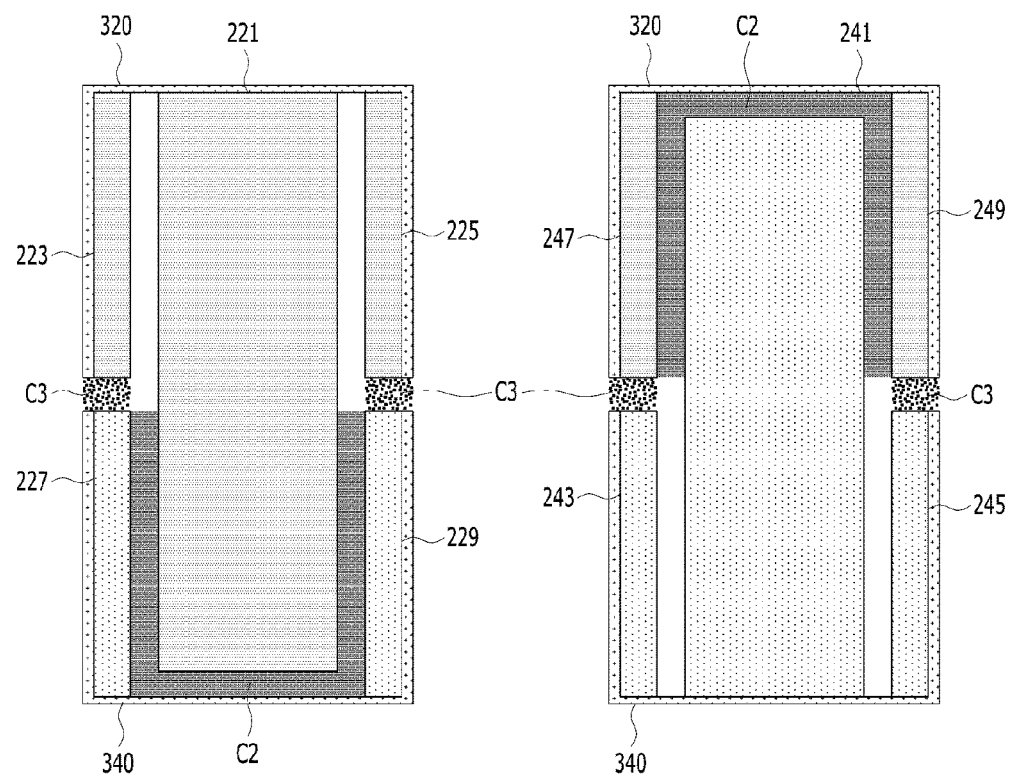

[FIG. 7]
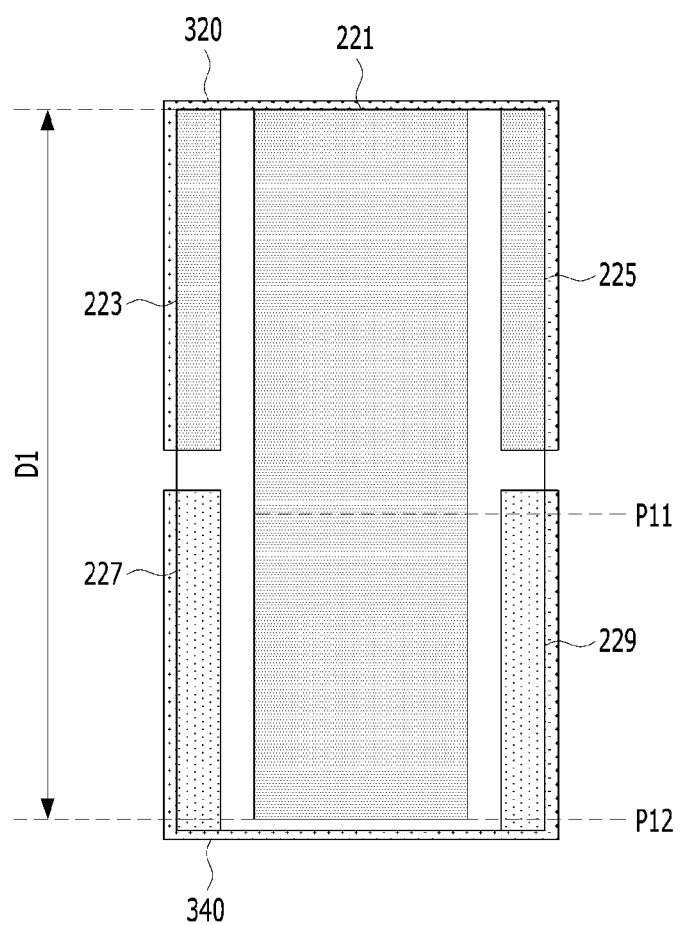

[FIG. 8]
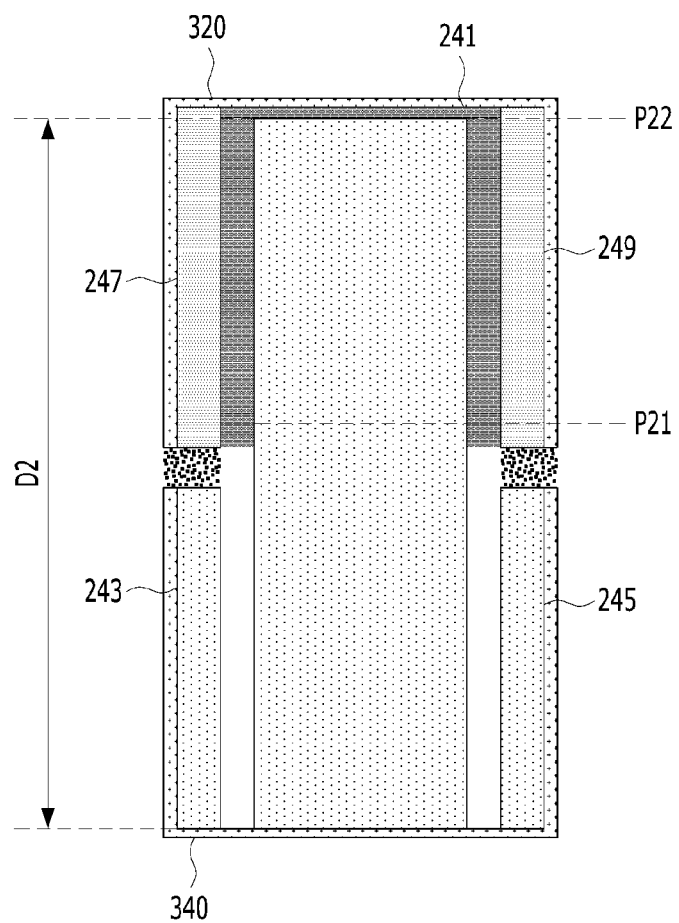

[FIG. 9]
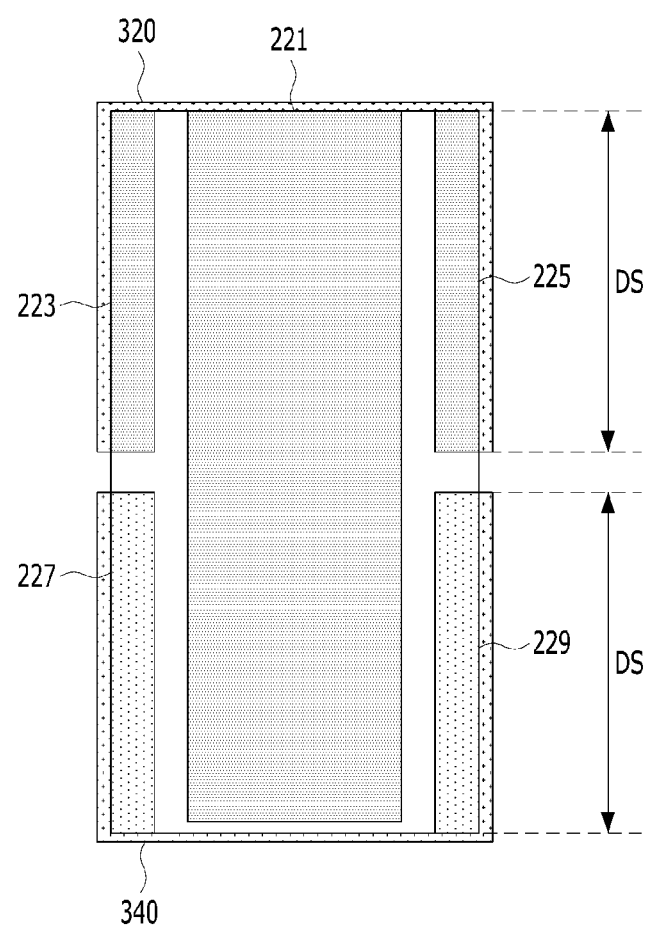

[FIG. 10]
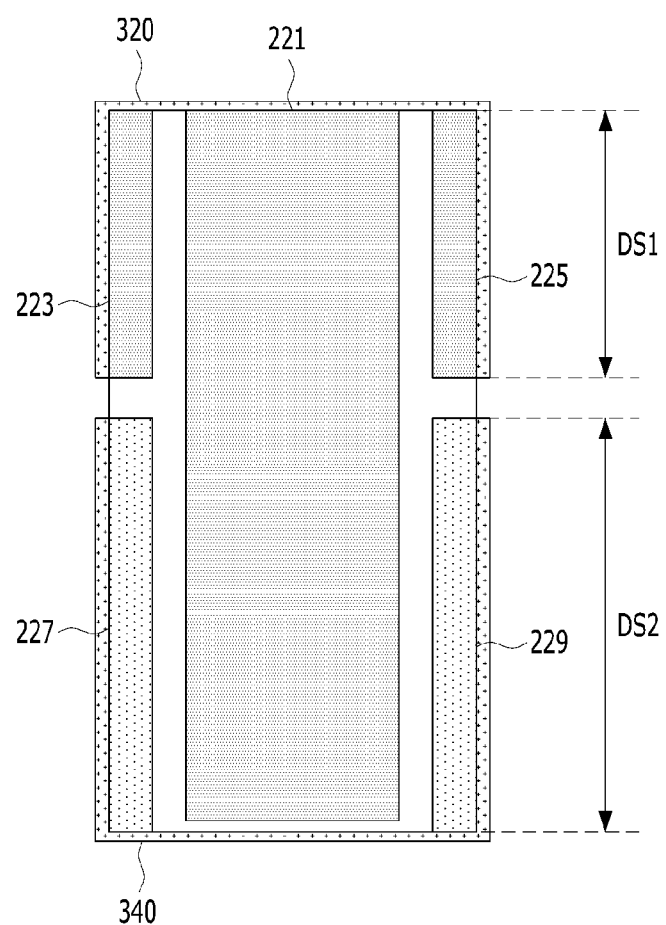

[FIG. 11]
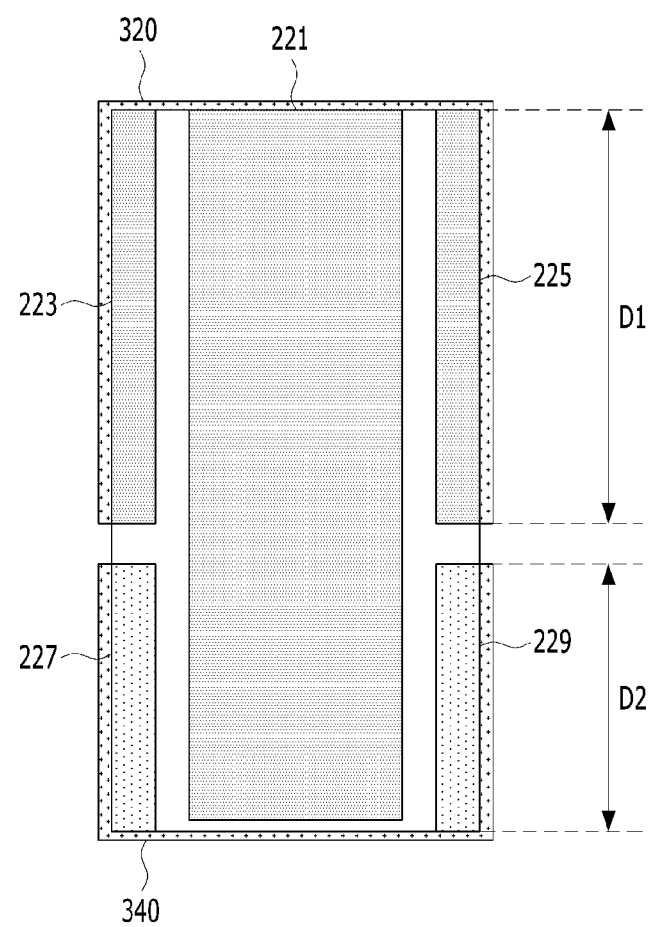

[FIG. 12]
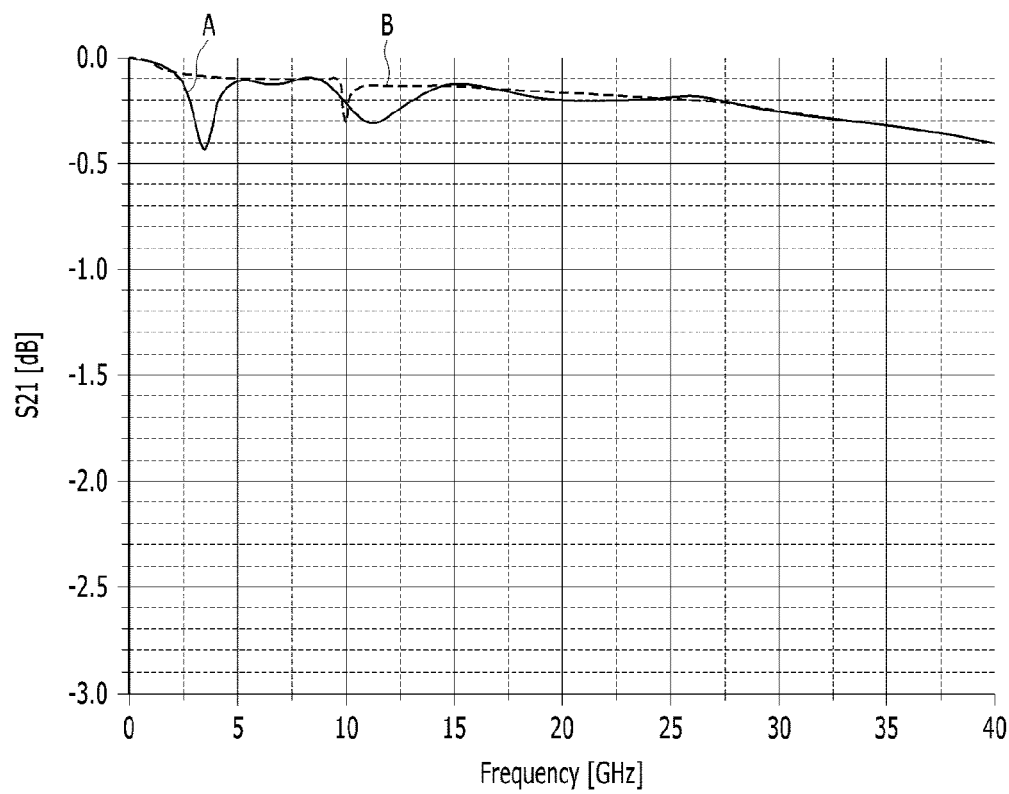

[FIG. 13]
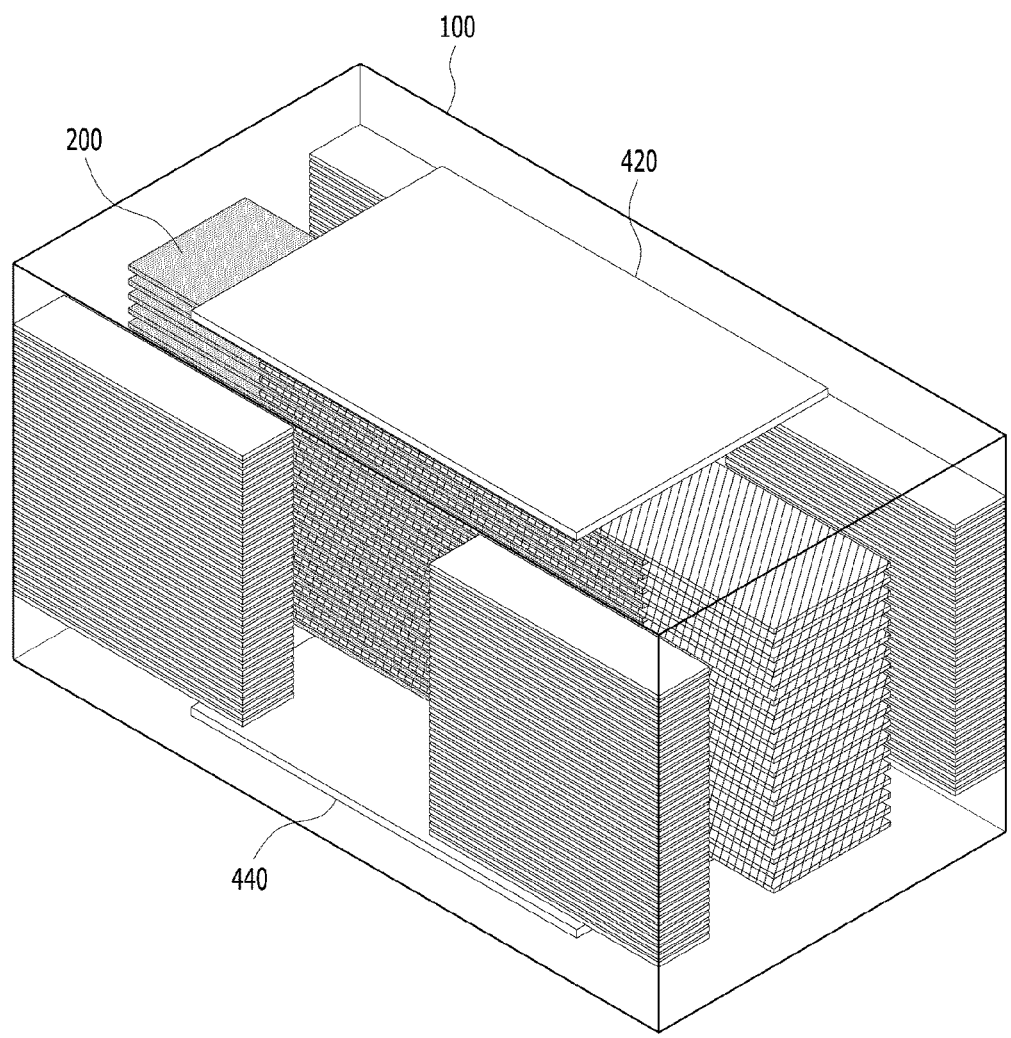

[FIG. 14]
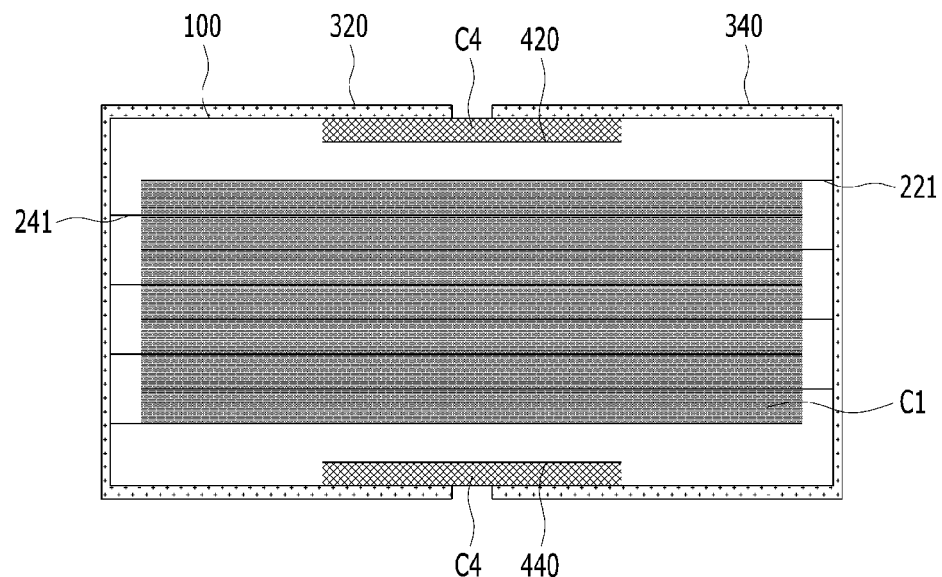
[FIG. 15]
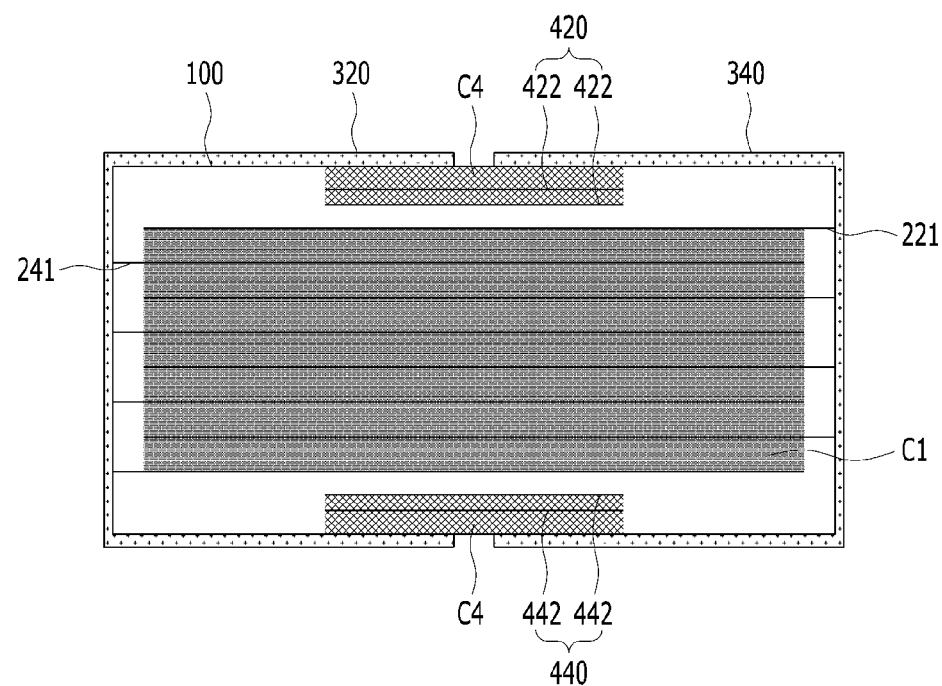

[FIG. 16]
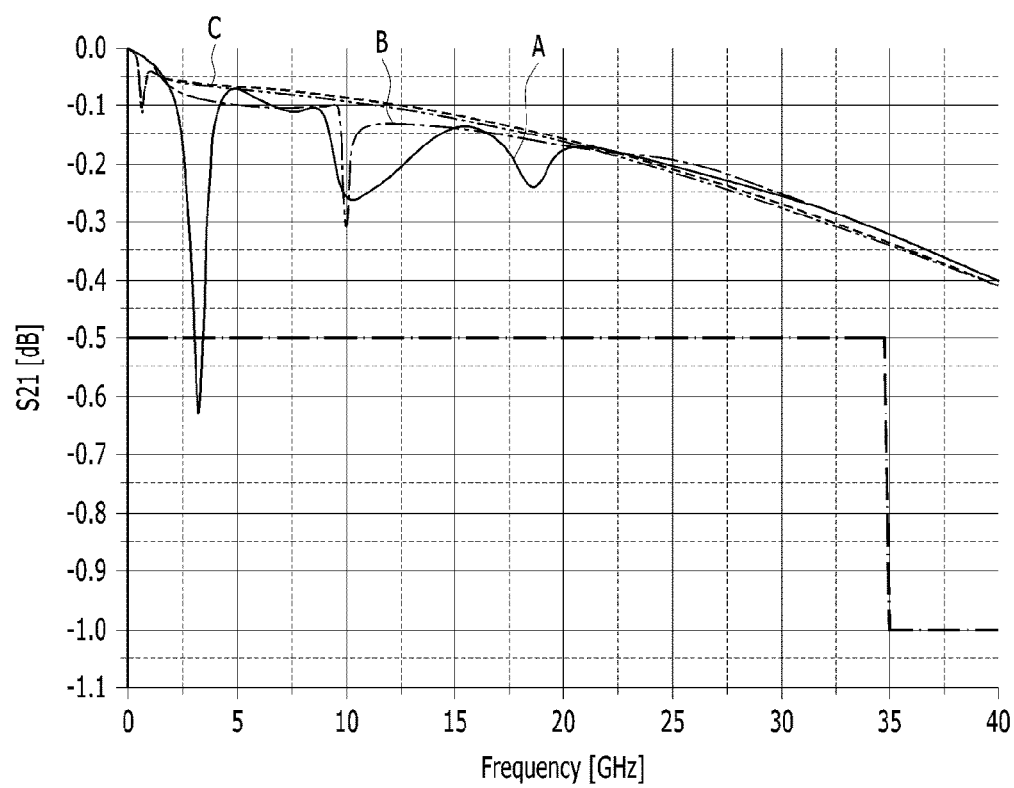

BROADBAND CAPACITOR

TECHNICAL FIELD

The present disclosure relates to a broadband capacitor, and more specifically, to a broadband capacitor used to constitute a high-speed communication network.

BACKGROUND ART

Conventional broadband capacitors are configured by stacking a plurality of electrode units composed of a main electrode having an extension arm formed on a side of one end and a C-type electrode surrounding the other end of the main electrode. The conventional broadband capacitors form a primary capacitance through overlapping between the main electrodes, and form a secondary capacitance between the C-type electrode and the main electrode to increase the capacitance, thereby implementing broadband characteristics.

However, the conventional broadband capacitors have a problem in that it is difficult to change a capacitance value because the range in which the area of the main electrode may be changed is limited due to the end which the extension arm and the main electrode are connected and the C-type electrode.

SUMMARY OF INVENTION

Technical Problem

The present disclosure has been proposed to solve the above conventional problem, and an object of the present disclosure is to provide a broadband capacitor, which constitutes an electrode unit with a main electrode and a plurality of side electrodes to facilitate a change in capacitance value.

In addition, the present disclosure has been proposed to solve the above conventional problem, and another object of the present disclosure is to provide a broadband capacitor, which disposes floating electrodes above and under a laminate in which a plurality of electrode units composed of a main electrode and a plurality of side electrodes are stacked.

Solution to Problem

In order to achieve the objects, a broadband capacitor according to an embodiment of the present disclosure includes a dielectric having a laminate in which a plurality of electrode sets are stacked, and having an upper surface, a lower surface, a first side surface, a second side surface opposite to the first side surface, a third side surface, and a fourth side surface opposite to the third side surface, a first external electrode disposed on the first side surface of the dielectric, and a second external electrode disposed on the second side surface of the dielectric and disposed to face the first external electrode, in which the plurality of electrode sets include a first electrode set and a second electrode set, and the laminate is configured by alternately stacking the first electrode set and the second electrode set.

The first electrode set may include a first main electrode having a first side, a second side opposite to the first side, a third side, and a fourth side opposite to the third side, a first side electrode spaced apart from the first main electrode and disposed to face the third side of the first main electrode, and disposed to be biased toward the first side of the first main electrode, a second side electrode spaced apart from the first main electrode and disposed to face the fourth side of the first main electrode, and disposed to be biased toward the first side of the first main electrode, a third side electrode spaced apart from the first main electrode and disposed to face the third side of the first main electrode, and disposed to be biased toward the second side of the first main electrode, and a fourth side electrode spaced apart from the first main electrode and disposed to face the fourth side of the first main electrode, and disposed to be biased toward the second side of the first main electrode.

At this time, the first side electrode and the second side electrode may have one sides disposed on the same line as the first side of the first main electrode, the third side electrode and the fourth side electrode do not have sides disposed on the same lines as the first side and the second side of the first main electrode, the first side electrode may be opposite to the second side electrode around the first main electrode, the third side electrode may be opposite to the fourth side electrode around the first main electrode, the first main electrode, the first side electrode, and the second side electrode may be electrically connected to the first external electrode, and the third side electrode and the fourth side electrode may be electrically connected to the second external electrode.

The second electrode set may include a second main electrode having a first side, a second side opposite to the first side, a third side, and a fourth side opposite to the third side, a fifth side electrode spaced apart from the second main electrode and disposed to face the third side of the second main electrode, and disposed to be biased toward the first side of the second main electrode, a sixth side electrode spaced apart from the second main electrode and disposed to face the fourth side of the second main electrode, and disposed to be biased toward the first side of the second main electrode, a seventh side electrode spaced apart from the second main electrode and disposed to face the third side of the second main electrode, and disposed to be biased toward the second side of the second main electrode, and an eighth side electrode spaced apart from the second main electrode and disposed to face the fourth side of the second main electrode, and disposed to be biased toward the second side of the second main electrode, At this time, the fifth side electrode and the sixth side electrode may have one sides disposed on the same line as the first side of the second main electrode, the seventh side electrode and the eighth side electrode do not have sides disposed on the same lines as the first side and the second side of the second main electrode, the fifth side electrode may be opposite to the sixth side electrode around the second main electrode, the seventh side electrode may be opposite to the eighth side electrode around the second main electrode, the second main electrode, the fifth side electrode, and the sixth side electrode may be electrically connected to the second external electrode, and the seventh side electrode and the eighth side electrode may be electrically connected to the first external electrode.

The dielectric may include a plurality of first dielectric sheets on which the first electrode set is disposed, and a second dielectric sheet on which the second electrode set is disposed, and the plurality of first dielectric sheets and the plurality of second dielectric sheets may be alternately stacked.

The first external electrode and the second external electrode may be disposed to extend to an upper surface, a lower surface, a third side surface, and a fourth side surface of the dielectric, and may be spaced apart from each other on the upper surface, the lower surface, the third side surface and the fourth surface of the dielectric.

The broadband capacitor according to the embodiment of the present disclosure may further include an upper floating electrode disposed inside the dielectric and disposed above the laminate, and overlapping with the first external electrode and the second external electrode disposed on an upper surface of the dielectric, and a lower floating electrode disposed inside the dielectric and disposed under the laminate, and overlapping with the first external electrode and the second external electrode disposed on a lower surface of the dielectric.

At this time, the upper floating electrode and the lower floating electrode may be located between the dielectric and the laminate and disposed inside the dielectric, and the upper floating electrode and the lower floating electrode may be spaced apart from the laminate with a dielectric layer interposed therebetween. The upper floating electrode may include one or more first electrode plates stacked between the upper surface of the dielectric and an upper surface of the laminate, and the lower floating electrode may include one or more second electrode plates stacked between the lower surface of the dielectric and a lower surface of the laminate.

Advantageous Effects of Invention

According to the present disclosure, when the broadband capacitor is manufactured in the same size as that of the general capacitor, the capacitance can be increased compared to the conventional capacitor, thereby maintaining the loss of the reference value or less in the range of the broad frequency band to cover the broadband.

In addition, the broadband capacitor can extend the main electrode to the location adjacent to the external electrode not electrically connected, thereby implementing the required capacitance value by changing the length of the main electrode to increase the degree of freedom of the capacitance value even in the small area.

In addition, the broadband capacitor can dispose the plurality of side patterns on the side surface of the main electrode, thereby reducing the resonance frequency and level compared to the conventional broadband capacitor to improve the broadband characteristics.

In addition, the broadband capacitor can dispose the floating electrodes above and under the laminate in which the plurality of electrode sets composed of the main electrode and the plurality of side electrodes are stacked, thereby reducing the resonance level.

In addition, the broadband capacitor can constitute the floating electrode in a plurality of layers, thereby further reducing the resonance level.

BRIEF DESCRIPTION OF DRAWINGS

FIGS. 1 to 4 are diagrams for describing a broadband capacitor according to a first embodiment of the present disclosure.

FIGS. 5 to 11 are diagrams for describing an electrode unit of the broadband capacitor according to the first embodiment of the present disclosure.

FIG. 12 is a diagram for comparing and describing performance of the broadband capacitor according to the first embodiment of the present disclosure and performance of the conventional broadband capacitor.

FIGS. 13 and 14 are diagrams for describing a broadband capacitor according to a second embodiment of the present disclosure.

FIG. 15 is a diagram for describing a modified example of the broadband capacitor according to the second embodiment of the present disclosure.

FIG. 16 is a diagram for comparing and describing performance of the broadband capacitor according to the second embodiment of the present disclosure and performance of the conventional broadband capacitor.

DESCRIPTION OF EMBODIMENTS

Hereinafter, the most preferred embodiments of the present disclosure will be described with reference to the accompanying drawings in order to specifically describe the embodiments so that those skilled in the art to which the present disclosure pertains can easily implement the technical spirit of the present disclosure. First, in adding reference numerals to the components of each drawing, it should be noted that the same components have the same reference numerals as much as possible even if they are illustrated in different drawings. In addition, in describing the present disclosure, when it is determined that the detailed description of the related well-known configuration or function can obscure the gist of the present disclosure, the detailed description thereof will be omitted.

Referring to FIGS. 1 to 4, a broadband capacitor according to a first embodiment of the present disclosure is configured to include a dielectric 100, a plurality of electrode units 200 disposed in the dielectric 100, a first external electrode 320, and a second external electrodes 340.

As an example, the dielectric 100 is configured in a rectangular parallelepiped having an upper surface, a lower surface, a first side surface, a second side surface opposite to the first side surface, a third side surface, and a fourth side surface opposite to the third side surface. The dielectric 100 may be configured by stacking a plurality of dielectric 100 sheets on which the electrode unit 200 is formed.

The first external electrode 320 is an electrode disposed on the first side surface of the dielectric 100. The first external electrode 320 and the second external electrode 340 may be formed to extend to the upper surface, the lower surface, the third side surface, and the fourth side surface of the dielectric 100.

The second external electrode 340 is an electrode disposed on the second side surface of the dielectric 100. The second external electrode 340 and the second external electrode 340 may be formed to extend to the upper surface, the lower surface, the third side surface, and the fourth side surface of the dielectric 100.

At this time, the first external electrode 320 and the second external electrode 340 may be formed to be spaced apart from the upper surface, the lower surface, the third side surface, and the fourth side surface of the dielectric 100 by a predetermined interval to face each other.

A plurality of electrode units 200 are sequentially stacked and disposed inside the dielectric 100. Each electrode unit 200 is configured to include a first electrode set 220 and a second electrode set 240. Accordingly, as an example, the inside of the dielectric 100 is formed by alternately stacking a plurality of dielectric 100 sheets on which the first electrode set 220 is formed and a plurality of dielectric 100 sheets on which the second electrode set 240 is formed.

Here, although FIG. 4 shows that three electrode units 200 (i.e., three first electrode sets 220 and three second electrode sets 240) are stacked, the number of electrode units 200 stacked to constitute the broadband capacitor may be variously changed depending on the characteristics of the capacitance and the like required for the installed places, and thus is not limited to the number shown in the drawing.

The first electrode set 220 includes a first main electrode 221, a first side electrode 223, a second side electrode 225, a third side electrode 227, and a fourth side electrode 229.

The first main electrode 221 is formed of a plate-shaped conductor. The first main electrode 221 has a first side electrically connected to the first external electrode 320, a second side opposite to the first side, a third side disposed toward ends of one sides of the first side and the second side, and a fourth side disposed toward ends of the other sides of the first side and the second side to be opposite to the third side.

The first side electrode 223 is formed of a plate-shaped conductor and disposed to be spaced apart from the first main electrode 221 by a predetermined interval. The first side electrode 223 is disposed to be biased toward the first side direction of the first main electrode 221 at the third side direction of the first main electrode 221.

The second side electrode 225 is formed of a plate-shaped conductor and disposed to be spaced apart from the first main electrode 221 by a predetermined interval. The second side electrode 225 is disposed to be biased toward the first side direction of the first main electrode 221 at the fourth side direction of the first main electrode 221. Accordingly, the second side electrode 225 is disposed to be opposite to the first side electrode 223 with the first main electrode 221 as a center.

The third side electrode 227 is formed of a plate-shaped conductor and disposed to be spaced apart from the first main electrode 221 by a predetermined interval. The third side electrode 227 is disposed to be biased toward the second side direction of the first main electrode 221 at the third side direction of the first main electrode 221. Accordingly, the third side electrode 227 is disposed to face the first main electrode 221 and the first side electrode 223.

The fourth side electrode 229 is formed of a plate-shaped conductor and disposed to be spaced apart from the first main electrode 221 by a predetermined interval. The fourth side electrode 229 is disposed to be biased toward the second side direction of the first main electrode 221 at the fourth side direction of the first main electrode 221. Accordingly, the fourth side electrode 229 is disposed to be opposite to the third side electrode 227 with the first main electrode 221 as a center, and disposed to face the first main electrode 221 and the second side electrode 225.

At this time, the first main electrode 221, the first side electrode 223, and the second side electrode 225 are electrically connected to the first external electrode 320, and the third side electrode 227 and the fourth side electrode 229 are electrically connected to the second external electrode 340. In addition, the second side of the first main electrode 221 is spaced apart from the second external electrode 340 by a predetermined interval and electrically separated from the second external electrode 340.

The second electrode set 240 is configured to include a second main electrode 241, a fifth side electrode 243, a sixth side electrode 245, a seventh side electrode 247, and an eighth side electrode 249.

The second main electrode 241 is formed of a plate-shaped conductor. The second main electrode 241 has a first side electrically connected to the second external electrode 340, a second side opposite to the first side, a third side disposed toward ends of one sides of the first side and the second side, and a fourth side disposed toward ends of the other sides of the first side and the second side to be opposite to the third side.

The fifth side electrode 243 is formed of a plate-shaped conductor and disposed to be spaced apart from the second main electrode 241 by a predetermined interval. The fifth side electrode 243 is disposed to be biased toward the first side direction of the second main electrode 241 at the third side direction of the second main electrode 241.

The sixth side electrode 245 is formed of a plate-shaped conductor and disposed to be spaced apart from the second main electrode 241 by a predetermined interval. The sixth side electrode 245 is disposed to be biased toward the first side direction of the second main electrode 241 at the fourth side direction of the second main electrode 241. Accordingly, the sixth side electrode 245 is disposed to be opposite to the fifth side electrode 243 with the second main electrode 241 as a center.

The seventh side electrode 247 is formed of a plate-shaped conductor and disposed to be spaced apart from the second main electrode 241 by a predetermined interval. The seventh side electrode 247 is disposed to be biased toward the second side direction of the second main electrode 241 at the third side direction of the second main electrode 241. Accordingly, the seventh side electrode 247 is disposed to face the second main electrode 241 and the fifth side electrode 243.

The eighth side electrode 249 is formed of a plate-shaped conductor and disposed to be spaced apart from the second main electrode 241 by a predetermined interval. The eighth side electrode 249 is disposed to be biased toward the second side direction of the second main electrode 241 at the fourth side direction of the second main electrode 241. Accordingly, the eighth side electrode 249 is disposed to be opposite to the seventh side electrode 247 around the second main electrode 241, and disposed to face the second main electrode 241 and the sixth side electrode 245.

At this time, the second main electrode 241, the fifth side electrode 243, and the sixth side electrode 245 are electrically connected to the second external electrode 340, and the seventh side electrode 247 and the eighth side electrode 249 are electrically connected to the first external electrode 320. In addition, the second side of the second main electrode 241 is spaced apart from the first external electrode 320 by a predetermined interval and electrically separated from the first external electrode 320.

Referring to FIGS. 5 and 6, the broadband capacitor forms a first capacitance C1 between adjacent electrode units 200. In other words, as the plurality of electrode units 200 are stacked, an overlapping region is formed between the first main electrode 221 and the second main electrode 241, and the broadband capacitor forms the first capacitance C1 in the overlapping region between the first main electrode 221 and the second main electrode 221.

In addition, the broadband capacitor forms a second capacitance C2 in a region where the main electrode and the side electrode face each other and in a region where the main electrode and the external electrode face each other. In other words, the broadband capacitor forms the second capacitance C2 between the first main electrode 221 and the third side electrode 227, between the first main electrode 221 and the fourth side electrode 229, and between the first main electrode 221 and the second external electrode 340. The broadband capacitor forms the second capacitance C2 between the second main electrode 241 and the seventh side electrode 247, between the second main electrode 241 and the eighth side electrode 249, and between the second main electrode 241 and the first external electrode 320. At this time, the second capacitance C2 smaller than the first capacitance C1 is formed between the main electrode, the side electrode, and the external electrode.

In addition, the broadband capacitor forms a third capacitance C3 in a region where two side electrodes disposed adjacent to each other face each other. In other words, the broadband capacitor forms the third capacitance C3 between the first side electrode 223 and the third side electrode 227, between the second side electrode 225 and the fourth side electrode 229, between the fifth side electrode 243 and the seventh side electrode 247, and between the sixth side electrode 245 and the eighth side electrode 249. At this time, the third capacitance C3 smaller than the first capacitance C1 and the second capacitance C2 is formed between two side electrodes disposed adjacent to each other.

As described above, when the broadband capacitor is manufactured in the same size as that of the general capacitor, the capacitance can be increased compared to the conventional capacitor, thereby maintaining the loss of a reference value or less in a range of a wide frequency band.

Referring to FIGS. 7 and 8, a length D1 of the first main electrode 221 may be changed to adjust (change) the capacitance. In other words, the length D1 of the first main electrode 221 refers to a straight distance from the first side to the second side of the first main electrode 221, and may be changed from a location P11 where there exists a region facing the third side electrode 227 and the fourth side electrode 229 while forming a minimum overlapping region with the second main electrode 241 to a location P12 closest to the second external electrode 340 while being not electrically connected to the second external electrode 340.

A length D2 of the second main electrode 241 may also be changed to adjust the capacitance. In other words, the length D2 of the second main electrode 241 refers to a straight distance from the first side to the second side of the second main electrode 241, and may be changed from a location P21 where there exists a region facing the seventh side electrode 247 and the eighth side electrode 249 while forming a minimum overlapping region with the first main electrode 221 to a location P22 closest to the first external electrode 320 while being not electrically connected to the first external electrode 320.

As described above, the broadband capacitor can extend the main electrode to the location adjacent to the external electrode not electrically connected, thereby implementing the required capacitance value by changing the length of the main electrode to increase the degree of freedom of the capacitance value even in a small area.

The broadband capacitor also may change a length (DS) of the side electrode to adjust (change) the capacitance.

Referring to FIG. 9, all of the first side electrode 223 to the fourth side electrode 229 are generally formed to have the same length DS.

Referring to FIG. 10, when the capacitance is increased, the region should be increased when the first main electrode 221, the third side electrode 227, and the fourth side electrode 229 face each other, so that a length DS2 of the third side electrode 227 and the fourth side electrode 229 is longer than a length DS1 of the first side electrode 223 and the second side electrode 225.

Referring to FIG. 11, when the capacitance is reduced, the region should be reduced when the first main electrode 221, the third side electrode 227, and the fourth side electrode 229 face each other, so that the length DS2 of the third side electrode 227 and the fourth side electrode 229 is shorter than the length DS1 of the first side electrode 223 and the second side electrode 225.

Here, although not shown in the drawings, the fifth side electrode 243 to the eighth side electrode 249 may also be changed to adjust (change) the capacitance like the first side electrode 223 and the fourth side electrode 229.

Referring to FIG. 12, resonance occurs at about 4 GHz and about 12 GHz in a conventional broadband capacitor A, and a resonance level at each frequency is measured to be about −0.4 dB and about −0.3 dB.

On the other hand, when resonance occurs only at about 10 GHz in a broadband capacitor B according to the first embodiment of the present disclosure, a resonance level at the corresponding frequency is measured to be about −0.3 dB.

As described above, the broadband capacitor according to the first embodiment of the present disclosure can dispose the plurality of side patterns on the side surface of the main electrode, thereby reducing the resonance frequency and level compared to the conventional broadband capacitor to improve the broadband characteristics.

Referring to FIG. 13, a broadband capacitor according to a second embodiment of the present disclosure may further include an upper floating electrode 420 disposed above the laminate in which the plurality of electrode sets are stacked, and a lower floating electrode 440 disposed under the laminate.

The upper floating electrode 420 is formed of a plate-shaped conductor. The upper floating electrode 420 is disposed above the laminate in which the plurality of electrode units are stacked. The upper floating electrode 420 is spaced apart from the electrode set disposed on an uppermost portion of the laminate by a predetermined interval, and a dielectric layer is interposed therebetween.

The lower floating electrode 440 is formed of a plate-shaped conductor. The lower floating electrode 440 is disposed under the laminate in which the plurality of electrode units are stacked. The lower floating electrode 440 is spaced apart from the electrode set disposed at a lowermost portion of the laminate by a predetermined interval, and a dielectric layer is interposed therebetween.

The upper floating electrode 420 and the lower floating electrode 440 are disposed to be opposite to each other around the laminate, and disposed so that at least a part thereof overlaps the first external electrode 320 and the second external electrode 340.

Here, the broadband capacitor according to the second embodiment of the present disclosure has been shown and described as including both the upper floating electrode 420 and the lower floating electrode 440, but is not limited thereto and may also be configured to include only one floating electrode. Even in this case, the resonance level can be reduced compared to the conventional broadband capacitor.

The broadband capacitor increases the total capacitance using the fourth capacitance formed between the external electrode and the floating electrode without using the flange effect in which the capacitance is formed in the separation space between the external electrodes in the conventional broadband capacitor.

Referring to FIG. 14, the fourth capacitance is formed between the first and second external electrodes disposed on the upper surface of the dielectric and the upper floating electrode 420. Likewise, the fourth capacitance is also formed between the first and second external electrodes disposed on the lower portion of the dielectric and the lower floating electrode 440. At this time, the fourth capacitance has a capacitance value greater than or equal to the capacitance formed between the external electrodes.

Referring to FIG. 15, the upper floating electrode 420 and the lower floating electrode 440 may be each configured to include a plurality of electrode plates.

The upper floating electrode 420 is configured by stacking a plurality of first electrode plates 422. At this time, the plurality of first electrode plates 422 are each disposed on a dielectric sheet, and as the dielectric sheets are stacked, a dielectric layer is interposed between the plurality of first electrode plates 422.

The lower floating electrode 440 is configured by stacking a plurality of second electrode plates 442. At this time, the plurality of second electrode plates 442 are each disposed on a dielectric sheet, and as the dielectric sheets are stacked, a dielectric layer is interposed between the plurality of second electrode plates 442.

The fourth capacitance is formed between the first and second external electrodes disposed on the upper surface of the dielectric and the upper floating electrode 420. Likewise, the fourth capacitance is also formed between the first and second external electrodes disposed on the lower portion of the dielectric and the lower floating electrode 440. At this time, the fourth capacitance may also be formed between the first electrode plates 422 and the second electrode plates.

Referring to FIG. 16, resonance occurs at about 4 GHz, about 10 GHz, and about 18 GHz in the conventional broadband capacitor A, and a resonance level at each frequency is measured to be about −0.64 dB, about −0.27 dB, and about −0.24 dB.

On the other hand, in a structure B in which the plurality of side patterns are disposed on the side surface of the main electrode among the broadband capacitors according to the second embodiment of the present disclosure, when resonance occurs only at about 10 GHz, a resonance level at the corresponding frequency is measured to be about −0.31 dB.

In addition, in a structure C in which a single-layer floating electrode is disposed among the broadband capacitors according to the second embodiment of the present disclosure, resonance occurs only at about 1 GHz, and a resonance level at the corresponding frequency is measured to be about −0.11 dB.

At this time, in the structure in which the multi-layer floating electrode is disposed among the broadband capacitors according to the second embodiment of the present disclosure, the substantially same resonance and resonance level as those of the single-layer floating electrode structure are measured, and the resonance level is slightly reduced.

As described above, the broadband capacitor according to the embodiment of the present disclosure can dispose the floating electrodes above and under the laminate in which the plurality of electrode sets composed of the main electrode and the plurality of side electrodes are stacked, thereby reducing the resonance level.

In addition, the broadband capacitor according to the embodiment of the present disclosure can constitute the floating electrode in a plurality of layers, thereby further reducing the resonance level.

Here, the floating electrode may also be disposed on the laminate in which the plurality of electrode units composed of the main electrode having the extension arm formed on the side surface of one end and the C-type electrode surrounding the other end of the main electrode are stacked, but when the floating electrode is disposed above the laminate in which the electrode sets including the main electrode and the plurality of side electrodes are stacked, the effect of reducing the resonance level is increased.

Although the preferred embodiments of the present disclosure have been described above, it is understood that the present disclosure can be modified in various forms, and those skilled in the art can practice various modified examples and changed examples without departing from the scope of the claims of the present disclosure.

The invention claimed is:

1. A broadband capacitor comprising:
a dielectric having a laminate in which a plurality of electrode sets are stacked, and having an upper surface, a lower surface, a first side surface, a second side surface opposite to the first side surface, a third side surface, and a fourth side surface opposite to the third side surface;
a first external electrode disposed on the first side surface of the dielectric; and
a second external electrode disposed on the second side surface of the dielectric and disposed to be opposite to the first external electrode,
wherein the plurality of electrode sets comprise a first electrode set and a second electrode set,
wherein the laminate is configured by alternately stacking the first electrode set and the second electrode set,
wherein the first electrode set comprises:
a first main electrode having a first side, a second side opposite to the first side, a third side, and a fourth side opposite to the third side,
a first side electrode spaced apart from the first main electrode and disposed to face the third side of the first main electrode, and disposed to be biased toward the first side of the first main electrode,
a second side electrode spaced apart from the first main electrode and disposed to face the fourth side of the first main electrode, and disposed to be biased toward the first side of the first main electrode,
a third side electrode spaced apart from the first main electrode and disposed to face the third side of the first main electrode, and disposed to be biased toward the second side of the first main electrode, and
a fourth side electrode spaced apart from the first main electrode and disposed to face the fourth side of the first main electrode, and disposed to be biased toward the second side of the first main electrode, and
wherein lengths of the first and second side electrodes are different from lengths of the third and fourth side electrodes.

2. The broadband capacitor of claim 1,
wherein the first side electrode and the second side electrode have one sides disposed on the same line as the first side of the first main electrode, and the third side electrode and the fourth side electrode do not have sides disposed on the same lines as the first side and the second side of the first main electrode.

3. The broadband capacitor of claim 1,
wherein the first side electrode is opposite to the second side electrode with the first main electrode as a center, and the third side electrode is opposite to the fourth side electrode with the first main electrode as a center.

4. The broadband capacitor of claim 1,
wherein the first main electrode, the first side electrode, and the second side electrode are electrically connected to the first external electrode, and
the third side electrode and the fourth side electrode are electrically connected to the second external electrode.

5. The broadband capacitor of claim 1,
wherein the second electrode set comprises a second main electrode having a first side, a second side opposite to the first side, a third side, and a fourth side opposite to the third side, a fifth side electrode spaced apart from the second main electrode and disposed to face the third side of the second main electrode, and disposed to be biased toward the first side of the second main electrode, a sixth side electrode spaced apart from the second main electrode and disposed to face the fourth side of the second main electrode, and disposed to be biased toward the first side of the second main electrode, a seventh side electrode spaced apart from the second main electrode and disposed to face the third side of the second main electrode, and disposed to be biased toward the second side of the second main electrode, and an eighth side electrode spaced apart from the second main electrode and disposed to face the fourth side of the second main electrode, and disposed to be biased toward the second side of the second main electrode.

6. The broadband capacitor of claim 5,
wherein the fifth side electrode and the sixth side electrode have one sides disposed on the same line as the first side of the second main electrode, and the seventh side electrode and the eighth side electrode do not have sides disposed on the same lines as the first side and the second side of the second main electrode.

7. The broadband capacitor of claim 5,
wherein the fifth side electrode is opposite to the sixth side electrode with the second main electrode as a center, and the seventh side electrode is opposite to the eighth side electrode with the second main electrode as a center.

8. The broadband capacitor of claim 5,
wherein the second main electrode, the fifth side electrode, and the sixth side electrode are electrically connected to the second external electrode, and
the seventh side electrode and the eighth side electrode are electrically connected to the first external electrode.

9. The broadband capacitor of claim 1,
wherein the dielectric comprises a plurality of first dielectric sheet on which the first electrode set is disposed, and a plurality of second dielectric sheet on which the second electrode set is disposed, and wherein the plurality of first dielectric sheets and the plurality of second dielectric sheets are alternately stacked.

10. The broadband capacitor of claim 1,
wherein the first external electrode and the second external electrode extend to an upper surface, a lower surface, a third side surface and a fourth side surface of the dielectric, and are spaced apart from each other on the upper surface, the lower surface, the third side surface and the fourth surface of the dielectric.

11. The broadband capacitor of claim 1, further comprising: an upper floating electrode disposed inside the dielectric and disposed above the laminate, and overlapping with the first external electrode and the second external electrode disposed on the upper surface of the dielectric.

12. The broadband capacitor of claim 11, further comprising: a lower floating electrode disposed inside the dielectric and disposed under the laminate, and overlapping with the first external electrode and the second external electrode disposed on the lower surface of the dielectric.

13. The broadband capacitor of claim 12,
wherein the upper floating electrode and the lower floating electrode are located between the dielectric and the laminate to dispose inside the dielectric, and
the upper floating electrode and the lower floating electrode are spaced apart from the laminate with a dielectric layer interposed therebetween.

14. The broadband capacitor of claim 12,
wherein the upper floating electrode comprises one or more first electrode plates stacked between the upper surface of the dielectric and an upper surface of the laminate, and
the lower floating electrode comprises one or more second electrode plates stacked between the lower surface of the dielectric and a lower surface of the laminate.

* * * * *